United States Patent [19]

Kimball

[11] Patent Number: 4,620,447

[45] Date of Patent: Nov. 4, 1986

[54] SINGLE PIN, UNIPLANAR DRIVER BAR ASSEMBLY

[75] Inventor: David V. Kimball, Monrovia, Calif.

[73] Assignee: Kimball Industries, Inc., Monrovia, Calif.

[21] Appl. No.: 726,469

[22] Filed: Apr. 24, 1985

[51] Int. Cl.[4] ............................................. G01N 29/00
[52] U.S. Cl. ........................................ 73/662; 73/663; 403/364
[58] Field of Search .................. 73/662, 663; 403/379, 403/388, 393, 364

[56] References Cited

U.S. PATENT DOCUMENTS

| | | | |
|---|---|---|---|
| 2,858,582 | 11/1958 | Toulmin | 403/364 |
| 4,392,381 | 7/1983 | Martin | 73/663 |
| 4,489,612 | 12/1984 | Griggs | 73/663 |

FOREIGN PATENT DOCUMENTS 625145  9/1978  U.S.S.R. .............................. 73/663

*Primary Examiner*—Anthony V. Ciarlante
*Attorney, Agent, or Firm*—Louis J. Bachand

[57] ABSTRACT

A driver bar assembly for coupling together a shaker head 12 and a slip plate 34 carrying a test piece 60 to be vibration tested, the assembly comprising a driver bar 14 having a laterally extended locus of intersection (L-L, P-P) with the slip plate in the slip plate plane of test movement, and fastener means comprising a rigid pin 50 extending laterally within the locus of intersection in slip plate and bar interconnecting relation for transmission of shaker head vibration to the slip plate through the pin.

22 Claims, 4 Drawing Figures

SINGLE PIN, UNIPLANAR DRIVER BAR ASSEMBLY

TECHNICAL FIELD

This invention relates to vibration and environmental test apparatus and more particularly to driver bar assemblies for such apparatus which are single pin coupled and thus uniquely easy to attach and detach to slip plates, movable vertically relative to the slip plate when not coupled so as to readily permit adjustment of the apparatus without need of relative movement of the slip plate or shaker, and at all times have the pin coupling in the plane of the slip plate to avoid inadvertent and unwanted rotational moments.

BACKGROUND

In the manufacture and design of mechanical and electronic components it is frequently necesary to evaluate the component or an entire assembly or subassembly of various components for their resistance to expected environments of use, e.g. aircraft components are desirably tested for resistance to certain types of vibration. In conducting such tests the test piece is secured to a slip plate which is slidably supported by a mass such as a granite block having an oil film surface and coupled to a programmable source of vibration such as an electrodynamic shaker. In practice, the shaker drives a shaker head, and a driver bar is interposed between the shaker head and the slip plate.

Driver bars are rigid bodies which are mounted by their base to the shaker head directly or through an adaptor, and from which a normally horizontal flange projects for connection to the slip plate.

Initially, the driver bar flange sandwiched the slip plate from above and below. In an improvement a design was invented which overlay the slip plate to facilitate separation of the slip plate from the driver bar flange without need of moving the driver bar and shaker laterally relative to the slip plate. Still later, a removable retainer was used which overlay and underlay the slip plate and the flange but which was laterally removable without moving the slip plate or the shaker head. See, for example U.S. Pat. No. 3,933,033 to Kimball and U.S. Pat. No. 4,392,381 to Martin. More recently, in U.S. Pat. No. 4,489,612 to Griggs the Kimball and Martin ideas were combined into a driver bar which had a H-section like the retainer of the Martin patent and in which one leg of the H was separable to be like the Kimball patent device.

In these developments the use of a plurality of pins to connect the driver bar flange to the slip plate at lateral series of registered holes remained a constant. Typically six or more or fewer pins were set at right angles to the slip plate and flange, and secured in place by cam means. Effective pins in these apparatus use precision camming devices to obtain adjustment and are therefore quite expensive.

The setting, lossening and resetting of multiple pins is disadvantageous in terms of labor required and for the potential of misadjustment that increases with multiple pins. Moreover, in those mentioned driver bar assemblies where directly opposed relation of the driver bar flange to the slip plate was realized, doubling of the number of pins was incurred, as two rows of pins were needed to connect the driver bar to the slip plate and shaker, thus increasing both capital and labor expense and increasing the potential for misadjustment.

SUMMARY OF THE INVENTION

It is accordingly an object of the present invention to an improvement in driver bar design. It is a further object to provide a driver bar in which the flange is opposed to the slip plate directly, and is movable relative to the slip plate by simple pivoting of the shaker head without movement of the slip plate or any intervening retainer element, and which is withal simply and facilely connected to the slip plate by a single pin rather than multiple or even multiple rows of pins.

These and other objects of the invention to become apparent hereinafter are realized in a driver bar assembly for coupling together a shaker head and a slip plate carrying a test piece to be vibration tested, the assembly comprising a driver bar having a laterally extended locus of intersection with the slip plate in the slip plate plane of test movement, and fastener means comprising a rigid pin extending laterally within the locus of intersection in slip plate and bar interconnecting relation for transmission of shaker head vibration to the slip plate through the pin.

In particular embodiments: the driver bar assembly bar has a discontinuous edge in the plane of movement of the slip plate adapted to interfit with the opposed portion of the slip plate; the plate has an edge portion adapted to interfit with the opposed bar in the plane of movement of the slip plate; the pin has longitudinally distributed separate extents interconnected with the bar and the slip plate respectively; and the fastener means further includes means to tighten the interconnection of the bar and the plate with the pin.

In a preferred embodiment, the invention provides a driver bar assembly for coupling together a shaker head and a slip plate carrying a test piece to be vibration tested, the assembly comprising a driver bar having a base adapted to be bolted to the shaker head, and a flange normal to the base and terminating outwardly in a laterally extended edge, the bar flange edge being discontinuous and adapted to define with the slip plate a laterally extended locus of intersection with the slip plate in the slip plate plane of test movement, and fastener means comprising a rigid pin extending across discontinuities in the the bar flange edge and laterally within the locus of intersection in slip plate and bar interconnecting relation for transmission of shaker head vibration to the slip plate through the pin.

In this and like embodiments of the invention, the driver bar flange edge discontinuities define a laterally distributed series of fingers spaced by intervening notches, the fingers are transversely bored to receive the pin, the finger bores are split to freely receive the pin, means are provided to radially close the bores upon the pin, the closing means comprises a bolt means extending transverse to the bore split in split closing relation, and the finger bores are adapted to register with like bores in the opposing edge of the slip plate for passing the pin between the respective bores within the locus of intersection.

The invention further contemplates the foregoing driver bar assemblies in combination with a cooperating slip plate, e.g. one having with said driver bar complementary edge discontinuities. In particular the invention contemplates in combination, the driver bar assembly and a cooperating slip plate, the slip plate having a discontinuous edge defining a laterally distributed series of fingers spaced by intervening notches, the slip plate and the driver bar being magnesium, the slip plate fingers being transversely bored to receive the pin, the slip plate finger bores being split to freely receive the pin, and use of means to radially close the slip plate finger bores upon the pin, such as a bolt means extending transverse to the bore split in split closing relation, the slip plate finger bores being adapted to register with like bores in the opposing edge of the driver bar flange for passing the pin between the respective bores within the locus of intersection.

The invention further provides a slip plate for carrying a test piece to be vibration tested, comprising a rigid plate having a discontinuous edge to oppose a driver bar flange, the slip plate edge defining a locus of intersection with a cooperating driver bar flange edge.

The invention further provides method of vibration testing a test piece, including securing the test piece to a slip plate, edgewise intersecting the slip plate with a shaker driven driver bar and fastening the bar and slip plate together with a common pin extending laterally through the locus of intersection; and in particular embodiments, coupling successive continued extents of the pin alternately to the bar flange and slip plate respectively.

DRAWINGS

The invention will be further described as to an illustrative embodiment in conjuction with the attached drawing in which.

PREFERRED MODES

Figure 1:
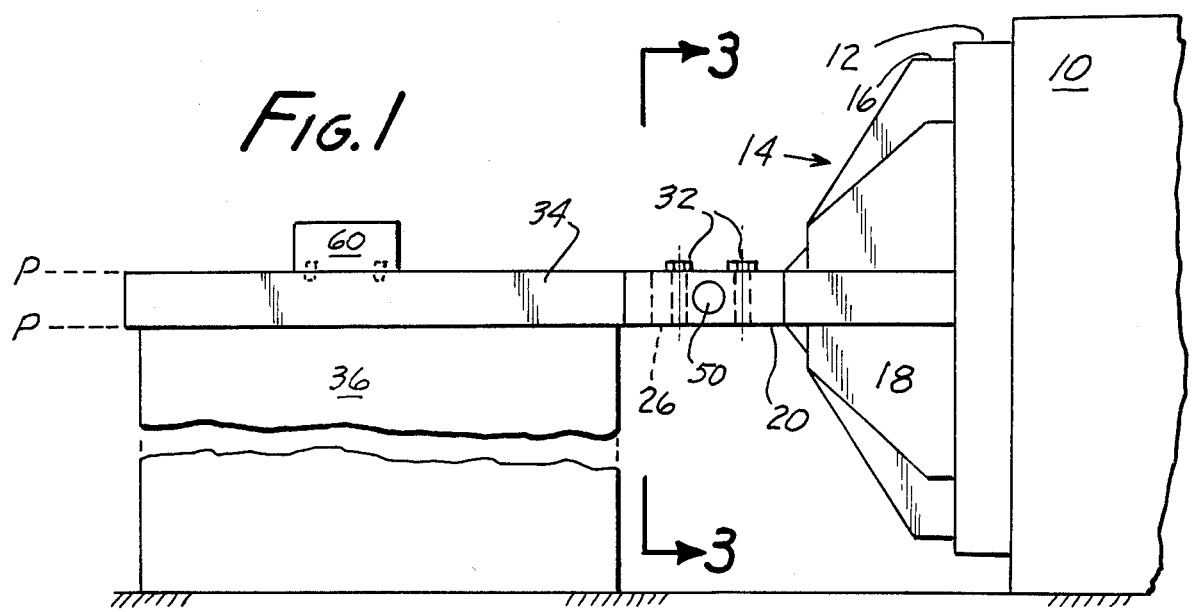
FIG. 1 is a view in side elevation of the present apparatus.
Figure 2:
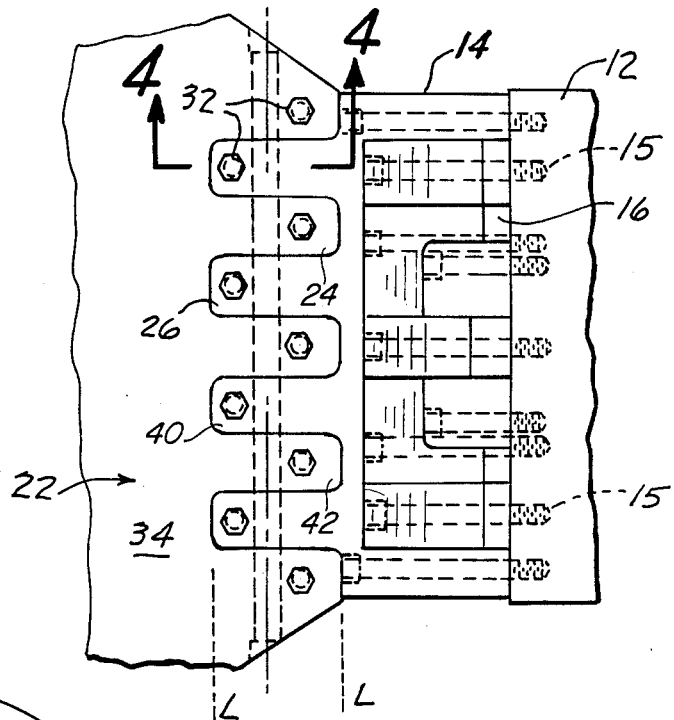
FIG. 2 is a fragmentary top plan view thereof.
Figure 3:
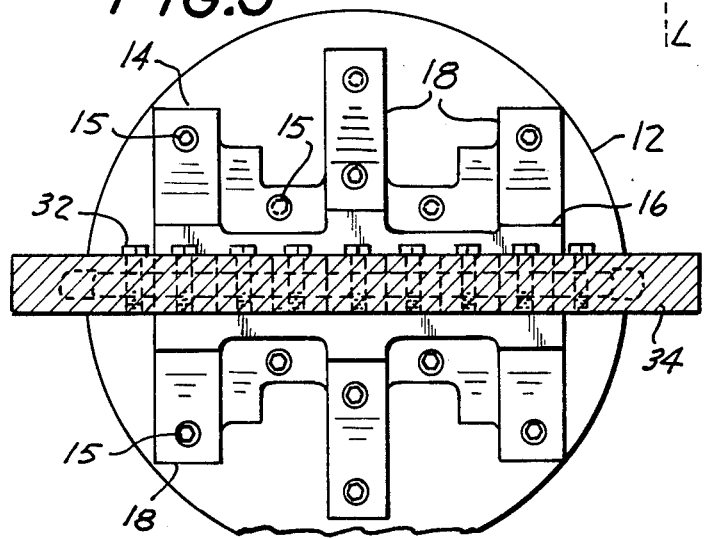
FIG. 3 is a front view taken on line 3—3 in FIG. 1.
Figure 4:
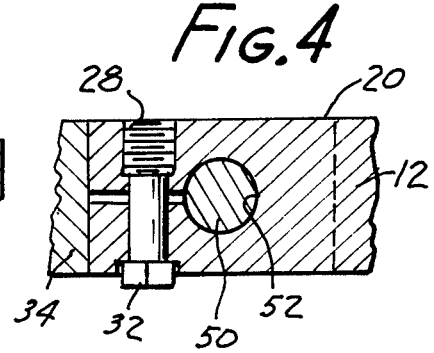
FIG. 4 is a fragmentary view in section taken on line 4—4 in FIG. 2.

With reference now to FIGS. 1 to 4 of the drawing in detail, a conventional electrodynamic shaker is indicated at 10. Shaker 10 drives a shaker head 12 in a pattern of vibration determined by the user. Driver bar 14 is formed in accordance with the invention and comprises a base portion 16 disposed vertically and having a laterally distributed series of vertically extended gussets 18 of outwardly diminishing dimension as shown, which support a normally horizontal flange 20. Driver bar 14 is attached to the shaker head 12 by a series of bolts 15.

The driver bar flange 20 is typically formed of magnesium and has a laterally extended outer edge 22 which is discontinuous in a regular pattern as shown, with equal width notches 24 spaced by equal width fingers 26, the notches and fingers dividing the absolute width of the bar flange 20 approximately evenly. The fingers 26 are horizontally split, see FIG. 4, to readily receive the pin 30 as described hereinafter. In addition, the fingers 26 are drilled and tapped at 28 at their outer extremities to receive fastening bolts 32 as will be hereinafter described.

Slip plate 34 is a metal member typically formed of magnesium like the driver bar and which rides on a cushion of oil atop a granite block 36 while being driven by the driver bar 14. Slip plate 34 has a laterally extending edge 38 opposite the driver bar flange edge 22. The slip plate 34 has a plane of movement determined by the movement of shaker head 12 and which in the drawing is indicated by the dashed lines P-P. It will be noted that the edge 22 of the flange 20 is within the plane P-P. The slip plate 34 edge 38 is formed to be complementary to the opposing flange edge 22. That is, the slip plate edge 38 has notches 40 and fingers 42 which interfit exactly with the fingers 26 and the notches 24 respectively of the driver bar flange 20 as shown. Other interfitting arrangements can be used than that illustrated so long as the respective discontinuities, notches 24 and 40 in the flange and slip plate respectively are adapted to interfit or are complementary.

The driver bar assembly includes in addition to the driver bar 14, a single pin 50 which couples the bar flange 20 and the slip plate 34. Each finger 26, 42 is bored at 52 to register with an adjacent finger 42, 26 respectively. The diameter of the bore 52 such as will snugly receive the pin 50. As noted above the fingers 26 are split and provided with adjustable fastening bolts for tightening on the pin 50, see FIG. 4. The fingers 42 of the slip plate are similarly split. Importantly, the pin 50 is a simple shaft and does not involve precision camming or other costly features, unlike pins used in previously known devices. The pin 50 may be segmented into one or more pin segments, provided coupling efficiency is maintained. Also additional pins 50 may be used in particular installations.

The fingers 26, 42 and notches 24, 40 of the interfitting flange 20 and slip plate 38 define a locus of intersection indicated by dashed lines L-L in the drawing. This locus of intersection is within the plate P-P defined by the plane of movement of the slip plate 34. The pin 50 is entirely within the locus of interception and parallel to the plane of movement of the slip plate 34, and normal to the direction of movement of the slip plate.

The slip plate 34 and the driver bar flange 20 are secured together by the pin 50 as follows. The bores 52 in the flange fingers 26 and slip plate fingers 42 are aligned in registered relation as shown. It will be noted that the slip plate 34 and the flange 20 are complementary in their respective edges so that they will pass each other unless the pin 50 is in place. This features enables mounting and demounting of the slip plate 34 to the driver bar 14 without need of moving the shaker 10. And unlike systems where the driver bar overlies the slip plate or added elements such as retainers are employed, the driver bar flange and slip plate are opposed in a common plane and the driver bar can be readily moved into interfitting position without need of rearrangement of the various parts.

The pin 50 is inserted endwise into the bores 52 in registration. In the drawing, and preferably, the different successive continuing extents of the pin 50 are alternately received by the bar flange 20 bores 52 and the slip plate 34 bores 52 to couple these members together. When the pin 50 is in place the bolts 32 are tightened drawing the split fingers together tightly against the pin, locking the system for efficient transmission of vibration between driver bar and slip plate so that test piece 60 receives its scheduled pattern of vibration.

I claim:

1. A driver bar assembly for coupling together a shaker head and a slip plate carrying a test piece to be vibration tested, said assembly comprising a driver bar having a laterally extended locus of intersection with said slip plate in the slip plate plane of test movement and fastener means comprising a rigid pin extending laterally within said locus of intersection in slip plate and bar interconnecting relation, and means to tighten said assembly in said relation for transmission of shaker head vibration to said slip plate through said pin.

2. The driver bar assembly according to claim 1, in which said bar has a discontinuous edge in the plane of movement of said slip plate adapted to interfit with the opposed portion of said slip plate.

3. The driver bar assembly according to claim 1, in which said plate has an edge portion adapted to interfit with the opposed bar in the plane of movement of said slip plate.

4. The driver bar assembly according to claim 1, in which said pin has longitudinally distributed separate extents interconnected with said bar and said slip plate respectively.

5. In combination, the driver bar assembly according to claim 1 and a cooperating slip plate.

6. A driver bar assembly for coupling together a shaker head and a slip plate carrying a test piece to be vibration tested, said assembly comprising a driver bar having a laterally extended locus of intersection with said slip plate in the slip plate plane of test movement and a pin fastener extending laterally within said locus of intersection in slip plate and bar interconnecting relation, and means to tighten the pin interconnection of said bar and plate.

7. A driver bar assembly for coupling together a shaker head and a slip plate carrying a test piece to be vibration tested, said assembly comprising a driver bar having a base adapted to be bolted to said shaker head, and a flange normal to said base and terminating outwardly in a laterally extended edge, said bar flange edge being discontinuous and having a split, transverse bore and adapted to define with said slip plate a laterally extended locus of intersection with said slip plate in the slip plate plane of test movement, and fastener means comprising a rigid pin adapted to be freely received in said flange bore to extend across discontinuities in the said bar flange edge and laterally within said locus of intersection in slip plate and bar interconnecting relation for transmission for shaker head vibration to said slip plate through said pin.

8. The driver bar assembly according to claim 7, in which said driver bar flange edge discontinuities define a laterally distributed series of fingers spaced by intervening notches.

9. The driver bar according to claim 8, in which said fingers are transversely bored to receive said pin.

10. The driver bar assembly according to claim 9, in which said finger bores are adapted to register with like bores in the opposing edge of said slip plate for passing said pin between said respective bores within said locus of intersection.

11. In combination, the driver bar assembly according to claim 10 and a cooperating slip plate, said slip plate having a discontinuous edge defining a laterally distributed series of fingers spaced by intervening notches.

12. The combination according to claim 11, in which said slip plate and said driver bar are magnesium.

13. The combination according to claim 11, including also means to radially close said slip plate finger bores upon said pin.

14. The combination according to claim 13, in which said slip plate finger bore closing means comprises a bolt means extending transverse to said bore split in split closing relation.

15. The combination according to claim 14, in which said slip plate finger bores are adapted to register with like bores in the opposing edge of said driver bar flange for passing said pin between said respective bores within said locus of intersection.

16. In combination, the driver bar assembly according to claim 7 and a cooperating slip plate.

17. A driver bar assembly for coupling together a shaker head and a slip plate carrying a test piece to be vibration tested, said assembly comprising a driver bar having a base adapted to be bolted to said shaker head, and a laterally extended edge, said extended edge having discontinuities defining a laterally distributed series of fingers spaced by intervening notches, said fingers being transversely bored and split to receive a pin fastener freely, and a pin fastener extending through said finger bores and laterally within said locus of intersection in slip plate and bar interconnection relation for transmission of shaker head vibration to said slip plate through said pin.

18. The driver bar assembly according to claim 17, including also means to radially close said bores upon said pin.

19. The driver bar assembly according to claim 18, in which said closing means comprises a bolt means extending transverse to said bore split in split closing relation.

20. A slip plate for carrying a test piece to be vibration tested, comprising a rigid plate having a discontinuous edge defining a series of fingers having a split bore adapted to interfit an opposing driver bar flange, said slip plate edge defining a locus of intersection with said opposing driver bar flange edge.

21. Method of vibration testing a test piece, including securing the test piece to a slip plate, edgewise intersecting the slip plate with a shaker driven driver bar with a laterally extending locus of intersection in the slip plate plane of test movement and fastening said bar and slip plate together with a common pin by extending said pin laterally through said locus of intersection and tightening the bar and slip plate to each other through said pin.

22. A driver bar for driving a slip plate carrying a test piece to be vibration tested, comprising a base and a flange thereon, said flange having a discontinous edge defining a series of fingers having a split bore and adapted to interfit an opposing slip plate discontiuous edge, said driver bar flange defining a locus of intersection with said opposing slip plate edge.

* * * * *